US012255832B2

(12) United States Patent
Barnum et al.

(10) Patent No.: US 12,255,832 B2
(45) Date of Patent: *Mar. 18, 2025

(54) TECHNIQUES FOR EXCESS RESOURCE UTILIZATION

(71) Applicant: Capital One Services, LLC, McLean, VA (US)

(72) Inventors: Eric K. Barnum, Midlothian, VA (US); Bryan Pinos, Williamsburg, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/528,131

(22) Filed: Dec. 4, 2023

(65) Prior Publication Data

US 2024/0179104 A1    May 30, 2024

Related U.S. Application Data

(63) Continuation of application No. 18/084,961, filed on Dec. 20, 2022, now Pat. No. 11,838,220, which is a continuation of application No. 17/226,360, filed on Apr. 9, 2021, now Pat. No. 11,563,693, and a continuation of application No. 16/425,329, filed on May 29, 2019, now Pat. No. 11,005,774.

(51) Int. Cl.
| | |
|---|---|
| *H04L 47/762* | (2022.01) |
| *H04L 47/70* | (2022.01) |
| *H04L 47/78* | (2022.01) |
| *H04L 47/783* | (2022.01) |

(52) U.S. Cl.
CPC .......... *H04L 47/762* (2013.01); *H04L 47/781* (2013.01); *H04L 47/782* (2013.01); *H04L 47/783* (2013.01); *H04L 47/822* (2013.01)

(58) Field of Classification Search
None
See application file for complete search history.

(56) References Cited

U.S. PATENT DOCUMENTS

| | | | | |
|---|---|---|---|---|
| 10,070,344 | B1 * | 9/2018 | Dowlatkhah | H04W 28/16 |
| 2008/0189700 | A1 * | 8/2008 | Schmidt | G06F 9/455 |
| | | | | 718/1 |
| 2008/0256238 | A1 * | 10/2008 | Hu | G06F 9/5083 |
| | | | | 709/226 |
| 2017/0111268 | A1 * | 4/2017 | Swallow | H04L 45/125 |
| 2018/0157532 | A1 * | 6/2018 | Kumar | G06F 9/5061 |
| 2019/0149399 | A1 * | 5/2019 | Reed | H04L 41/0895 |
| | | | | 709/223 |

* cited by examiner

*Primary Examiner* — Angela Nguyen
(74) *Attorney, Agent, or Firm* — KDW Firm PLLC

(57) ABSTRACT

Techniques to utilize excess resources in a cloud system, such as by enabling an auxiliary resource utilizer to use resources while they are not needed to support primary resource utilizers, are described herein. Some embodiments are directed to identifying and allocating excess capacity of resources in a cloud system to auxiliary resource utilizers based on one or more policies. In various embodiments, excess resources in one or more of the set of resources in the cloud system, or cloud resources, may be determined based on monitoring utilization of the cloud resources by the primary resource utilizers. In many embodiments, an auxiliary resource utilizer that is in compliance with a set of utilization policies may be identified and the excess resources may be allocated to the auxiliary resource utilizer.

20 Claims, 8 Drawing Sheets

TECHNIQUES FOR EXCESS RESOURCE UTILIZATION

RELATED APPLICATIONS

This application is a continuation of U.S. patent application Ser. No. 18/084,961, titled "TECHNIQUES FOR EXCESS RESOURCE UTILIZATION" filed Dec. 20, 2022, now U.S. Pat. No. 11,838,220, which is a continuation of U.S. patent application Ser. No. 17/226,360, titled "TECHNIQUES FOR EXCESS RESOURCE UTILIZATION" filed on Apr. 9, 2021, now U.S. Pat. No. 11,563,693, which is a continuation of U.S. patent application Ser. No. 16/425,329, titled "TECHNIQUES FOR EXCESS RESOURCE UTILIZATION" filed on May 29, 2019, now U.S. Pat. No. 11,005,774. The contents of the aforementioned applications are incorporated herein by reference.

BACKGROUND

Generally, a computer network is a digital telecommunications network which allows nodes, or components, to share resources. In computer networks, computing devices exchange data with each other using connections between nodes via various transmission media, such as via wired or wireless mediums. Computer networks can support a large number of applications and services such as access to the World Wide Web, digital video, digital audio, and shared use of application and storage servers. The applications and services are implemented via various network resources communicatively coupled to the network, such as computing and/or storage resources. The amount of data moving across a computer network may be referred to as traffic. Typically, network data in computer networks is encapsulated in network packets, which are utilized by network resources to send and receive information.

DETAILED DESCRIPTION

Figure 1:
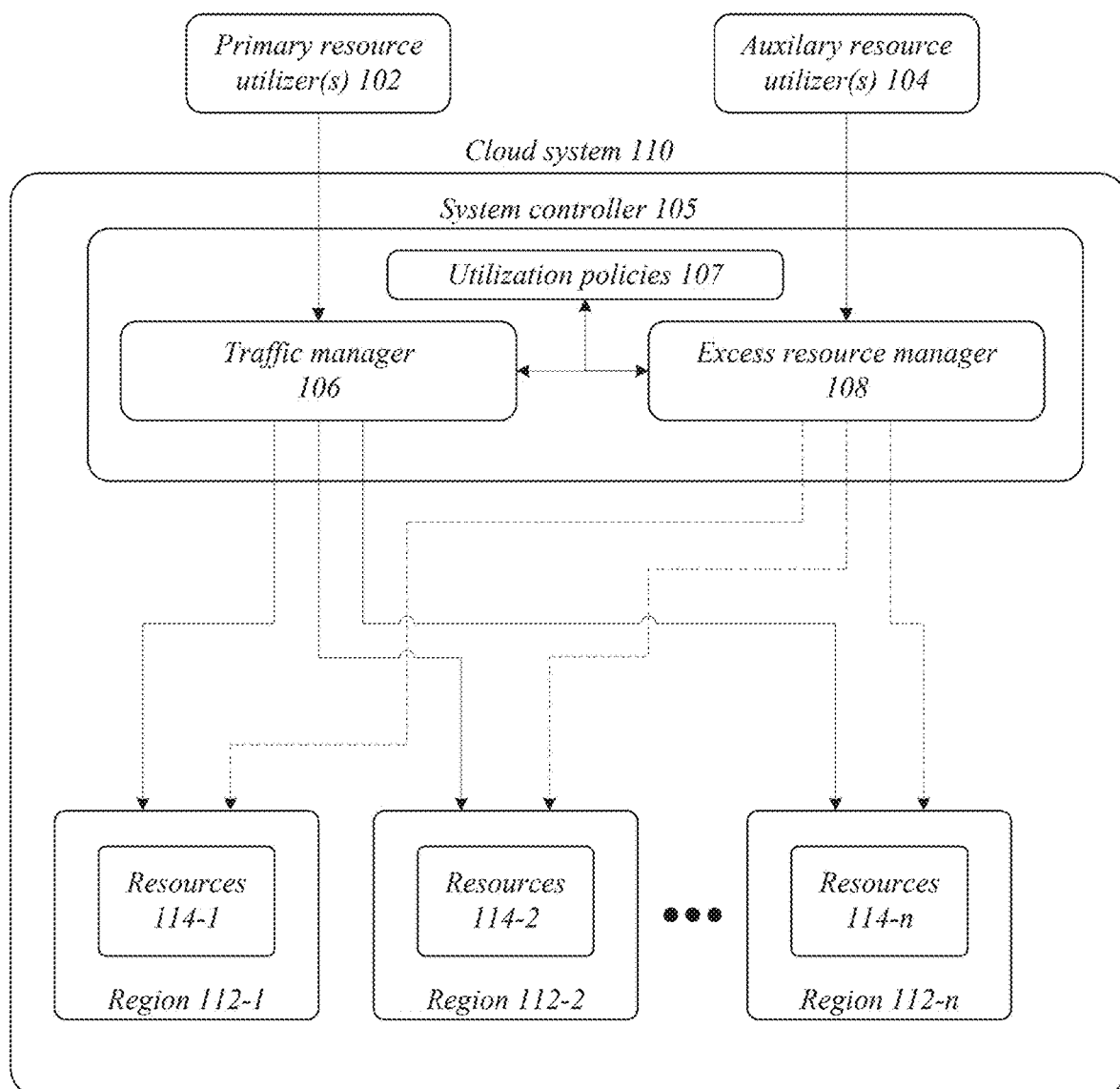
FIG. 1 illustrates an embodiment of a first operating environment according to one or more embodiments described herein.

Various embodiments are generally directed to techniques to utilize excess resources in a cloud system, such as by enabling an auxiliary resource utilizer to use resources while they are not needed to support primary resource utilizers, for instance. Some embodiments are particularly directed to identifying and allocating the excess capacity of resources in a cloud system to auxiliary resource utilizers based on one or more policies. For example, in various embodiments described herein may provide one or more of the following features and/or functionalities. In some embodiments, utilization of a set of resources in a cloud system by one or more primary resource utilizers may be monitored. In various embodiments, excess resources in one or more of the set of resources in the cloud system, or cloud resources, may be determined based on monitoring utilization of the cloud resources by the primary resource utilizers. In many embodiments, a set of utilization policies associated with the excess resources, such as terms of use, may be retrieved. In many such embodiments, an auxiliary resource utilizer that is in compliance with the set of utilization policies may be identified and the excess resources may be allocated to the auxiliary resource utilizer. In one or more embodiments, the set of utilization policies associated with the excess resources allocated to the auxiliary resource utilizer may be enforced. These and other embodiments are described and claimed.

Some challenges facing cloud systems include an inability to identify and utilize excess cloud resources. These challenges may result from the need for redundancy and/or standby resources to support services and applications for primary resource utilizers during peak traffic times. For example, cloud systems may be designed with sufficient resources to support peak loads. However, because peak loads occur infrequently, the additional resources required to support peak loads are only needed to support primary resource utilizers for small windows of time. Adding further complexity, a cloud system may include a complex and interdependent set of resources, causing allocation of excess resources to potentially have unanticipated and/or adverse consequences on other cloud resources. These and other factors may result in cloud systems with deficient performance, excessive costs, poor utilization, and insufficient ability to provide optimal and efficient allocation of excess resources. Such limitations can drastically reduce the capabilities, usability, and applicability of the cloud system, contributing to inefficient systems with limited capabilities.

Various embodiments described herein include an excess resource manager that is able to dynamically identify and allocate excess resources in a set of cloud resources to improve resource utilization and system efficiency. In many embodiments, the excess resource manager may enable auxiliary resource utilizers to use excess resources without adversely affecting the operation of the cloud system. For example, the excess resource manager may enable the excess resources to be utilized without disrupting the ability of the excess resources to support primary resource utilizers during times of peak load. In one or more embodiments, the excess resource manager may quickly and efficiently change resource allocation among various primary and auxiliary resource utilizers. In various embodiments, the excess resource manager may identify and enforce policies associated with the utilization of excess resources. For instance, if the load generated by primary resources utilizers crosses a threshold, the excess resource manager may automatically reassign one or more excess resources from supporting auxiliary resource utilizers to supporting primary resource utilizers. In several embodiments, the excess resource manager may configure or reconfigure various cloud resources as necessary to ensure reliable operation of the cloud system despite the dynamic allocation of the resources in the cloud system.

In these and other ways the excess resource manager may enable improved control over network resources, resulting in several technical effects and advantages over conventional computer technology, including increased efficiency and improved adaptability. In various embodiments, the excess resource manager may be implemented in a practical application via one or more computing devices, and thereby provide additional and useful functionality to the one or more computing devices, resulting in more capable, better functioning, and improved computing devices. In one or more embodiments, the excess resource manager may be implemented as a set of rules that improve computer-related technology by allowing a function not previously performable by a computer that enables an improved technological result to be achieved. In one or more such embodiments, the function may include dynamically monitoring and/or controlling cloud resources to improve efficiency and utilization of the cloud resources as an improved technological result.

Various embodiments described herein may include an apparatus comprising a processor and a memory comprising instructions that, when executed by the processor, cause the processor to perform operations comprising one or more of: monitor utilization of each cloud resource in a set of cloud resources by one or more primary resource utilizers; determine excess resources in one or more cloud resources in the set of cloud resources based on the utilization of each cloud resource in the set of cloud resources; retrieve a set of utilization policies associated with the excess resources; identify an auxiliary resource utilizer that is in compliance with the set of utilization policies associated with the excess resources; and allocate the excess resources to the auxiliary resource utilizer; and enforce the set of utilization policies associated with the excess resources allocated to the auxiliary resource utilizer.

One or more embodiments described herein may include at least one non-transitory computer-readable medium comprising a set of instructions that, in response to being executed by a processor circuit, cause the processor circuit to perform one or more of: allocate a cloud resource with a capacity to one or more primary resource utilizers; monitor utilization of the cloud resource by the one or more primary resource utilizers as a first portion of the capacity of the cloud resource; determine the first portion of the capacity of the cloud resource utilized by the one or more primary resource utilizers is below a threshold portion of the capacity; identify one or more auxiliary resource utilizers in compliance with a set of utilization policies associated with the cloud resource; and reallocate a second portion of the capacity of the cloud resource from the one or more primary resource utilizers to the one or more auxiliary resource utilizers, wherein the first and second portions of capacity of the cloud resource are equal to or less than the capacity of the cloud resource.

Some embodiments described herein may include a computer-implemented method comprising one or more of: determining utilization of each cloud resource in a set of cloud resources by one or more primary resource utilizers; identifying excess resources in one or more cloud resources in the set of cloud resources based on the utilization of each cloud resource in the set of cloud resources; identifying an auxiliary resource utilizer that is in compliance with a set of utilization policies associated with the excess resources; allocating the excess resources to the auxiliary resource utilizer; and enforcing the set of utilization policies associated with the excess resources allocated to the auxiliary resource utilizer.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given. For instance, in some embodiments, a machine may include a virtual machine implemented on a computing platform.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1 illustrates an embodiment of an operating environment 100 according to one or more embodiments described herein. Operating environment 100 may include a cloud system 110 in conjunction with one or more primary resource utilizers 102 and one or more auxiliary resource utilizers 104. In the illustrated embodiments, cloud system may include a system controller 105 and one or more regions 112-1, 112-2, 112-n with each region comprising a set of resources 114-1, 114-2, 114-n. The system controller 105 may include a traffic manager 106, an excess resource manager 108, and one or more utilization policies 107. In one or more embodiments described herein, the components of the system controller 105 may interoperate to enable underutilized resources in one or more of regions 112-1, 112-2, 112-n of cloud system 110 to be identified and allocated for use by one or more auxiliary resource utilizers 104 according to one or more utilization policies 107. Embodiments are not limited in this context.

In several embodiments, cloud system 110 may provide services and applications to one or more primary resource utilizers 102. In several such embodiments, the services and applications provided to the one or more primary resource utilizers 102 may be implemented via one or more sets of cloud resources. For example, cloud system 110 may include multiple sets of cloud resources divided into regions (e.g., resource set 114-1 in region 112-1, resource set 114-2 in region 112-2, and resource set 114-$n$ in region 112-$n$. In some embodiments, various cloud resource may have excess capacity to provide support at the time of peak load and/or resource failure. For example, services and/or applications implemented by cloud resources may be duplicated in multiple regions to provide redundancy or failover. In some such examples, the resources that provide the redundancy or failover may include excess resources when the redundancy or failover resources are standing by.

In many embodiments described herein, the system controller 105 and/or one or more components thereof (e.g., traffic manager 106 and/or excess resource manager 108) may identify and dynamically allocate excess resources in cloud system 110 for use by one or more auxiliary resources utilizers 104. In many such embodiments, the system controller 105 and/or one or more components thereof (e.g., excess resource manager 108) may identify and dynamically allocate excess resources in cloud system 110 for use by one or more auxiliary resources utilizers 104 according to one or more utilization policies 107. In one or more embodiments, primary resource utilizers 102 may include higher priority users while auxiliary resource utilizers 104 may include lower priority users. For example, primary resource utilizers 102 may include customers utilizing the resources for applications and/or services provided by a business and auxiliary resource utilizers 104 may include employees of the company or third parties that utilize the resources for one or more of testing, quality assurance, integration, simulations, developing, research, or the like.

In several embodiments, excess resources may be allocated to auxiliary resource utilizers 104 while still serving the redundancy or failover role. In several such embodiments, the excess resources may automatically be reallocated to one or more primary resources utilizers 102 on an on-demand basis. For example, traffic manager 106 may monitor utilization of the resources and enable excess resource manager 108 to determine when and/or who to allocate excess resources to. In some embodiments, traffic manager 106 and/or excess resource manager 108 may be implemented by the resources in cloud system 110. In various embodiments, traffic manager 106 and/or excess resource manager 108 may be separate from cloud system 110.

In various embodiments, the resources of cloud system 110 (e.g., resources 114-1, 114-2, 114-$n$) may refer to a pool of hardware that is utilized to provide computational or data services to an entity (e.g., a company) without the entity having physical access or control over the hardware providing the computational or data services. For example, resources 114-1, 114-2, 114-$n$ may include computational or data services utilized (e.g., under a rental agreement) by the entity independent of the underlying hardware. As previously mentioned, the resources of cloud system 110, the cloud resources, may be divided into one or more regions 112-1, 112-2, 112-$n$. In several embodiments, each of the one or more regions 112-1, 112-2, 112-$n$ may include independent pools of hardware that are utilized to provide computational or data services to the entity (e.g., resources 114-1, 114-2, 114-$n$).

Figure 2:
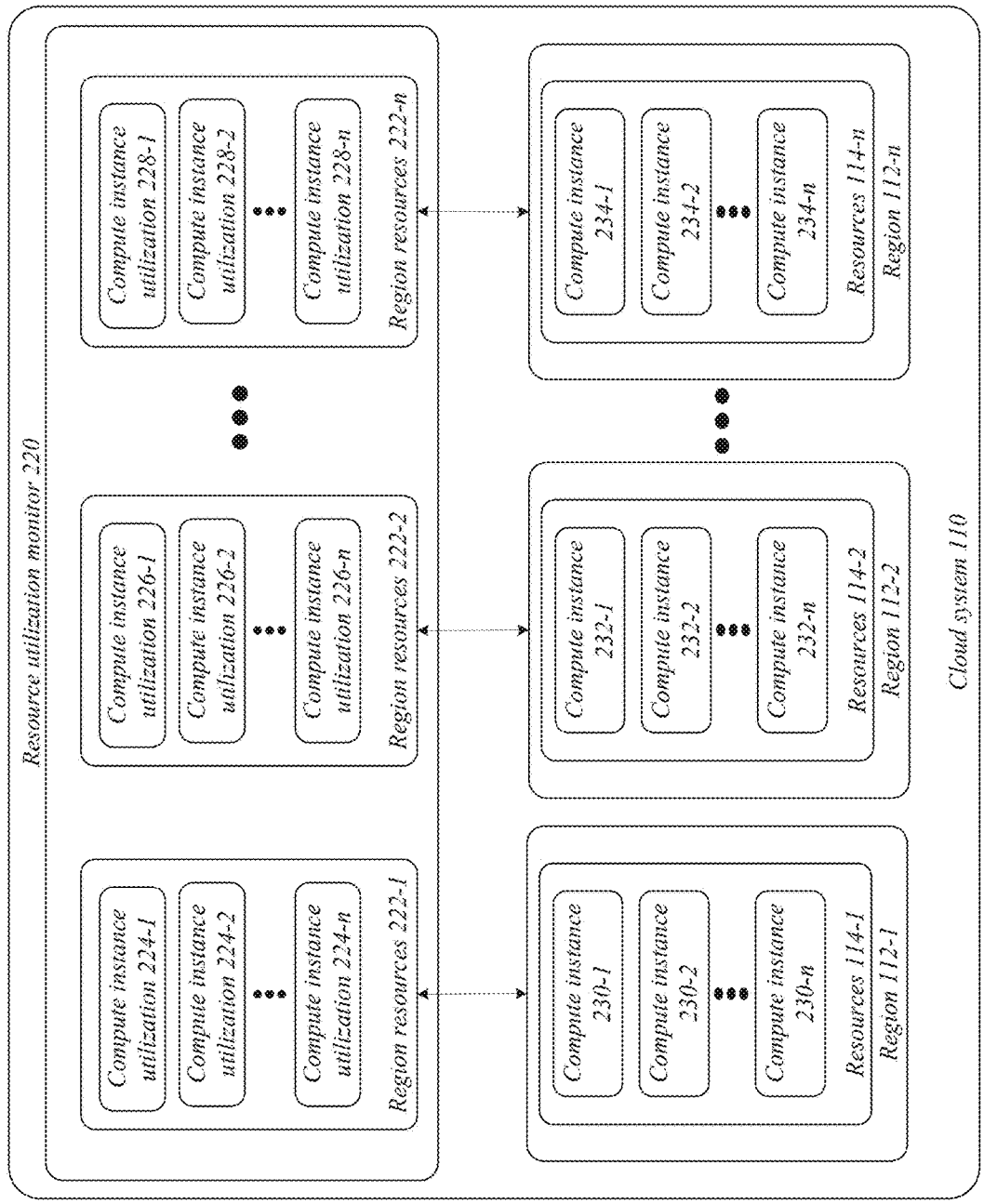
FIG. 2 illustrates exemplary aspects of a resource utilization monitor according to one or more embodiments described herein.

FIG. 2 illustrates exemplary aspects of a resource utilization monitor 220 in environment 200 according to one or more embodiments described herein. In environment 200, cloud system 110 may include resource utilization monitor 220 and one or more regions 112-1, 112-2, 112-$n$ with resource sets 114-1, 114-2, 114-$n$. In some embodiments, resource utilization monitor 220 may be included in traffic manager 106 and/or excess resource manager 108. In one or more embodiments described herein, resource utilization monitor 220 may monitor the utilization of resources in each of one or more regions (e.g., region 112-1, 112-2, 112-$n$) in cloud system 110. In one or more such embodiments, monitoring the utilization of resources may enable excess capacity to be identified to facilitate allocation of excess capacity to auxiliary resource utilizers. Embodiments are not limited in this context.

In the illustrated embodiment, the resources 114-1 of region 112-1 may include one or more compute instances 230-1, 230-2, 230-$n$, the resources 114-2 of region 112-2 may include one or more compute instances 232-1, 232-2, 232-$n$, and the resources 114-$n$ of region 112-$n$ may include one or more compute instances 234-1, 234-2, 234-$n$. It will be appreciated that each of the one or more regions 112-1, 112-2, 112-$n$ in cloud system 110 may include different or additional resources than those illustrated in FIG. 2. For example, the resources of cloud system 110 may include any component utilized by or included in cloud system 110, such as a data storage components or network infrastructure components.

In environment 200, resource utilization monitor 220 may include region resources 222-1 with one or more compute instance utilizations 224-1, 224-2, 224-$n$ corresponding to the one or more computer instances 230-1, 230-2, 230-$n$ in region 112-1 of cloud system 110, region resources 222-2 with one or more compute instance utilizations 226-1, 226-2, 226-$n$ corresponding to the one or more computer instances 232-1, 232-2, 232-$n$ in region 112-2 of cloud system 110, and region resources 222-$n$ with one or more compute instance utilizations 228-1, 228-2, 228-$n$ corresponding to the one or more computer instances 234-1, 234-2, 234-$n$ in region 112-$n$ of cloud system 110.

In various embodiments, resource utilization monitor 220 may track the utilization of each resource in each region that is allowed to be allocated to auxiliary resource utilizers. In some embodiments, the resources allowed to be allocated to auxiliary resource utilizers may be included in utilization policies 107. In many embodiments, resource utilization monitor 220 may include one or more region resources 222-1, 222-2, 222-$n$. In many such embodiments, the one or more region resources 222-1, 222-2, 222-$n$ may correspond to regions of resources in cloud system 110. In various embodiments, each of the one or more region resources 222-1, 222-2, 222-$n$ may be used to track the utilization of resources in the corresponding region. For instance, compute instance utilization 224-1 may include the utilization of compute instance 230-1 of region 112-1 and computer instance utilization 228-$n$ may include the utilization of computer instance 234-$n$ of region 112-$n$.

In some embodiments, resource utilization monitor 220 may additionally, or alternatively, monitor traffic flow in cloud system 110. For example, resource utilization monitor 220 may monitor traffic flow to and from each of regions 112-1, 112-2, 112-$n$. In some examples, resource utilization monitor 220 may monitor traffic flow to and from each compute instance in cloud system 110. In one or more embodiments, traffic flow may provide indications of pending resource utilization. In various embodiments, resource utilization monitor 220 may monitor types of traffic flowing to and/or from various components of cloud system 110. In various such embodiments, specific traffic types may be routed to excess resources. For instance, traffic may include video traffic and application program interface (API) traffic. In such instances, video traffic may be rerouted to excess resources to ensure the quality of service (QOS) is maintained with respect to the API traffic. In one or more embodiments, identification of excess resources and/or determining how, when, and/or where to allocate excess resources may be based at least in part on the parameters of components in cloud system 110 that are tracked by resource utilization monitor 220.

Figure 3:
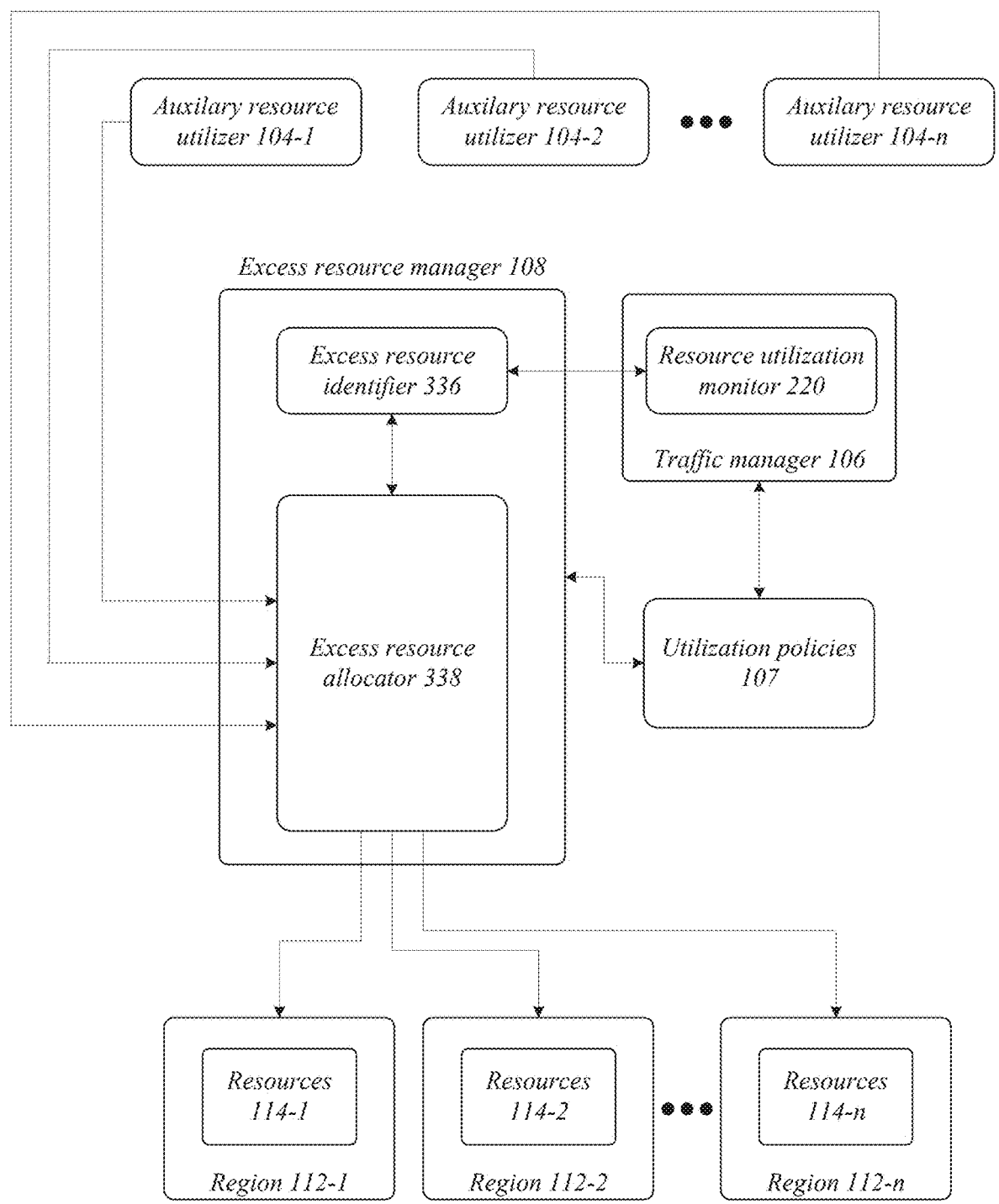
FIG. 3 illustrates exemplary aspects of an excess resource manager according to one or more embodiments described herein.

FIG. 3 illustrates exemplary aspects of an excess resource manager 108 in environment 300 according to one or more embodiments described herein. Environment 300 may include one or more auxiliary resource utilizers 104-1, 104-2, 104-n, excess resource manager 108 with excess resource identifier 336 and excess resources allocator 338, traffic manager 106 with resource utilization monitor 220, utilization policies 107, and one or more regions 112-1, 112-2, 112-n with corresponding sets of resources 114-1, 114-2, 114-n. In one or more embodiments described herein, excess resource manager 108 may identify and allocate one or more resources, or portions thereof, in regions 112-1, 112-2, 112-n to one or more auxiliary resource utilizers 104-1, 104-2, 104-n. Embodiments are not limited in this context.

In some embodiments, the excess resource identifier 336 of excess resource manager 108 may identify excess resources to allocate to one or more auxiliary resource utilizers based on utilization of the resources monitored by resource utilization monitor 220 and one or more utilization policies 107. For example, resource utilization monitor 220 may indicate that a compute instance in region 112-2 is not utilizing 40% of its capacity. In such examples, excess resource identifier 336 may determine that any excess capacity exceeding 20% of the compute instance in region 112-2 may be allocated to auxiliary resource utilizers based on utilization policies 107. In several embodiments, the excess resource identifier may retrieve a set of utilization policies associated with identified excess resources. In several such embodiments, the set of utilization policies associated with identified excess resources may be used to determine one or more auxiliary resource utilizers to which the excess resource may be allocated.

More generally, utilization policies 107 may include one or more rules associated with the use of resources by auxiliary resource utilizers. In various embodiments, utilization policies 107 may include rules associated with any component, or operation parameters thereof, that may impact the utilization of an associated resource. For example, utilization policies 107 may include characteristics of auxiliary resource utilizers or characteristics associated with the use of the excess resources that are required for use of excess resources (e.g., use by auxiliary resource utilizers may be interrupted without warning. In another example, utilization policies 107 may include time periods that excess resources are available (e.g., low traffic times). In yet another example, utilization policies 107 may include maximum utilization of the resource with excess capacity or maximum utilization of corresponding resources (e.g., resources that the excess resource provides failover for). In some such examples, when utilization of the resource with excess capacity or utilization of corresponding resources exceeds a threshold, the associated resources allocated to auxiliary resources utilizers may be automatically reallocated to primary resource utilizers.

In one or more embodiments, excess resource identifier 336 may identify one or more auxiliary resource utilizers that comply with and/or have consented to one or more utilization policies associated with identified excess resources. In one or more such embodiments, this may ensure that any resources allocated to auxiliary resource utilizers can be reclaimed for utilization by primary resource utilizers promptly. For instance, resources may need to be reallocated to primary resource utilizers to provide failover without interrupting services or applications provided to the primary resource utilizers. In some embodiments, the utilization policies 107 may limit an amount of reconfiguring of the excess resources for use by the auxiliary resource utilizers. In many embodiments, utilization policies 107 may require the auxiliary resource utilizers to generate and/or utilize the same type of traffic as associated with the primary resource utilizes.

In various embodiments, excess resource allocator 338 may allocate excess resources to an auxiliary resource utilizer based on indications from excess resource identifier 336. In various such embodiments, excess resource allocator 338 may configure the excess resources for use by the auxiliary resource utilizer. In some embodiments, excess resource allocator 338 may enforce one or more of the utilization policies 107 on the user of the excess resources by one or more auxiliary resource utilizers. In many embodiments, excess resource allocator 338 may reallocate and/or reconfigure excess resources allocated to auxiliary resource utilizers based on a violation of a utilization policy. For example, excess resource allocator 338 may reallocate and/or reconfigure excess resources allocated to auxiliary resource utilizers based on traffic and/or load associated with primary resource utilizers crossing a threshold.

Figure 4A:
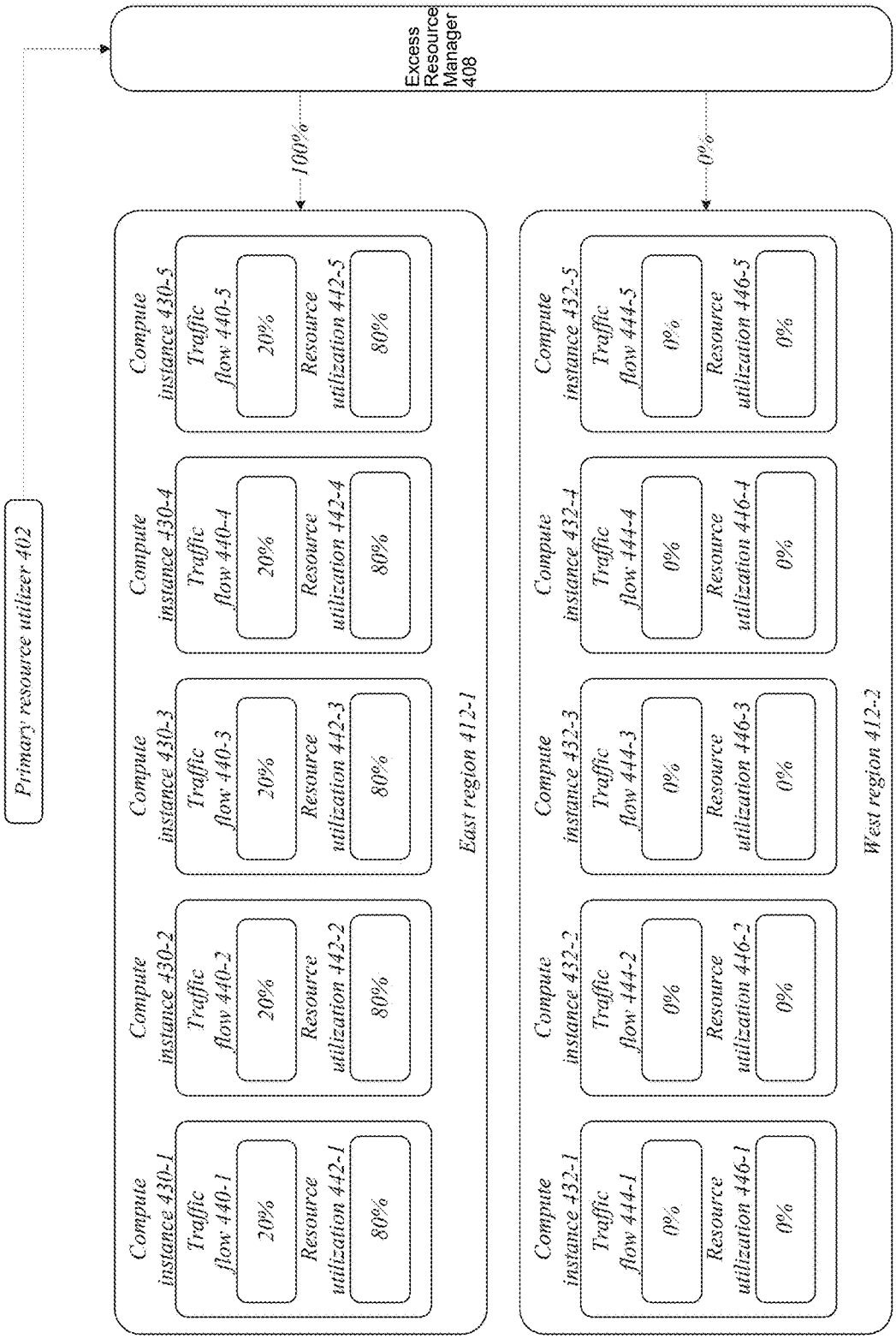
FIGS. 4A and 4B illustrate an exemplary processing flow of an excess resources allocator according to one or more embodiments described herein.
Figure 4B:
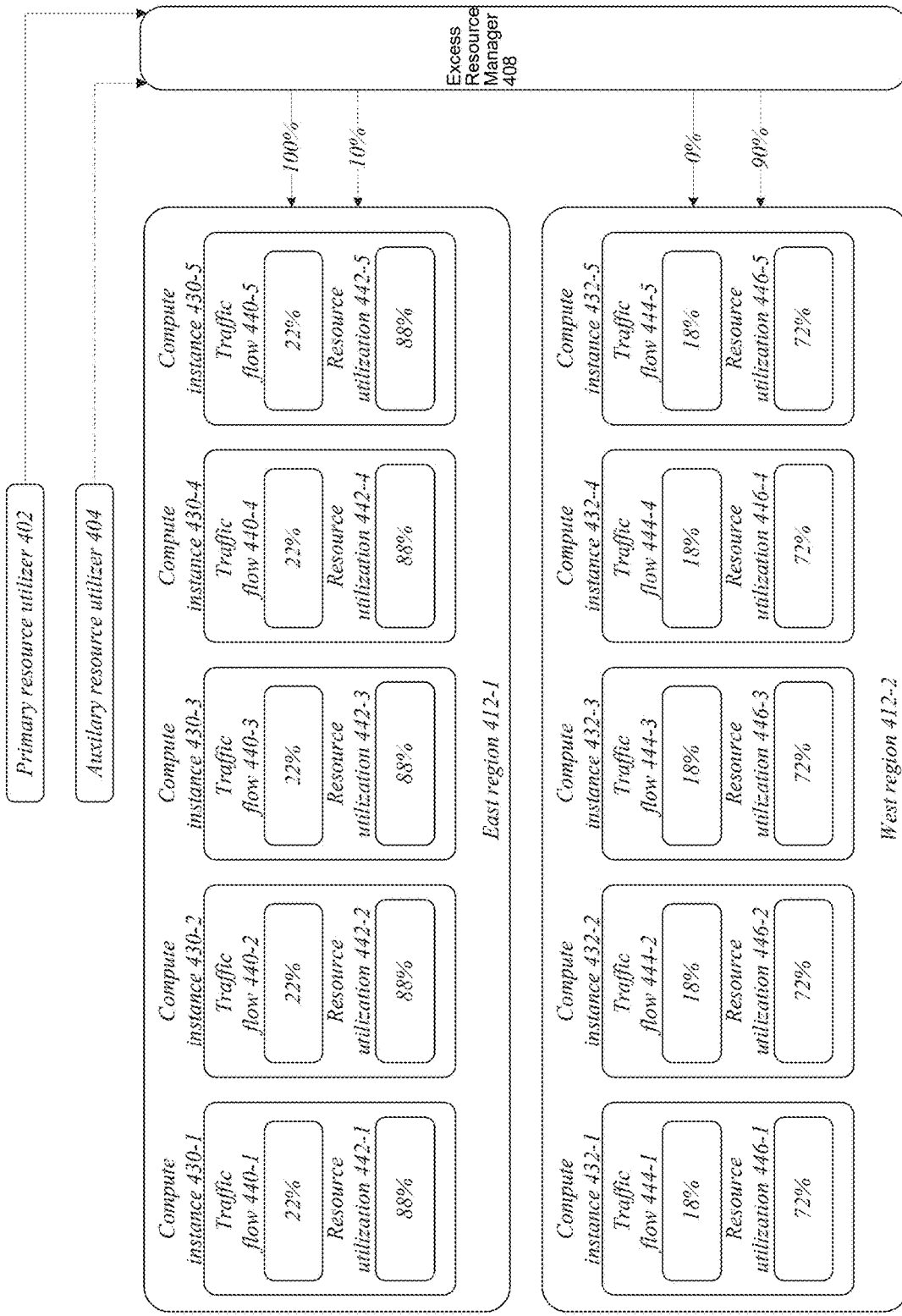

FIGS. 4A and 4B illustrate an exemplary processing flow of an excess resource manager 408 in environments 400A, 400B according to one or more embodiments described herein. Environment 400A may include one or more primary resource utilizers 402, excess resource manager 408, an east region 412-1 with compute instances 430-1, 430-2, 430-3, 430-4, 430-5, and a west region 412-2 with compute instances 432-1, 432-2, 432-3, 432-4, 432-5. Environment 400B may include an auxiliary resource utilizers 404 in addition to the components of environment 400A. In environment 400A, excess resource manager 408 may identify one or more excess resources based on traffic flow and/or resource utilization of the compute instances in east region 412-1 and west region 412-2. In environment 400B, excess resource manager 408 may allocate the one or more excess resources to auxiliary resource utilizer 404. Embodiments are not limited in this context.

Referring to FIG. 4A, excess resource manager 408 may determine traffic flow and resource utilization associated with each computer instance in east region 412-1 and west region 412-2. As shown in the illustrated embodiment, 100% of the traffic from primary resource utilizers 402 may be routed to the east region 412-1 and the traffic may be divided evenly between compute instances 430-1, 430-2, 430-3, 430-4, 430-5 such that each compute instance in east region 412-1 receives 20% of the traffic flow. In various embodiments, the 20% traffic flow to each compute instance in east region 412-1 may result in 80% resource utilization of the corresponding resources to process a respective traffic load. It will be appreciated that traffic loads may vary with time with higher traffic loads corresponding to higher resource utilization. Compute instance 430-1 may include traffic flow 440-1 of 20% and resource utilization 442-1 of 80%, compute instance 430-2 may include traffic flow 440-2 of 20% and resource utilization 442-2 of 80%, compute instance 430-3 may include traffic flow 440-3 of 20% and resource utilization 442-3 of 80%, compute instance 430-4 may include traffic flow 440-4 of 20% and resource utilization 442-4 of 80%, and compute instance 430-5 may include traffic flow 440-5 of 20% and resource utilization 442-5 of 80%, In one or more embodiments, these values may be determined by resource utilization monitor 220.

Further, west region 412-2 may receive no traffic from primary resource utilizers 402. For example, west region 412-2 may provide failover and/or dark instances for east region 412-1. In many embodiments, west region 412-2 may receive a minimal amount of traffic flow and/or resource utilization (e.g., <5%) to ensure proper operations and readiness of the resources in the region. In the illustrated embodiments, compute instance 432-1 may include traffic flow 444-1 of 0% and resource utilization 446-1 of 0%, compute instance 432-2 may include traffic flow 444-2 of 0% and resource utilization 446-2 of 0%, compute instance 432-3 may include traffic flow 444-3 of 00% and resource utilization 446-3 of 0%, compute instance 432-4 may include traffic flow 444-4 of 0% and resource utilization 446-4 of 0%, and compute instance 432-5 may include traffic flow 444-5 of 0% and resource utilization 446-5 of 0%, In one or more embodiments, these values may be determined by resource utilization monitor 220 based on log files and/or traffic sampling.

In many embodiments, in environment 400A, excess resource manager 408 may identify, in the east region 412-1 and/or the west region 412-2, excess resources not actively being used by primary resource utilizer 402, such as the compute instances 432 in region 412-2. Moving to FIG. 4B, in environment 400B, excess resource manager 408 may allocate excess resources identified in the east region 412-1 and/or the west region 412-2 for use by auxiliary resource utilizer 404. In various embodiments, excess resource manager 408 may allocate these excess resource based on and/or in compliance with one or more utilization policies 107. As shown in the illustrated embodiment, 100% of the traffic from the primary resource utilizers 402 is still being routed to the east region 412-1 and 10% of the traffic from the secondary resource utilizers 404 is being routed to excess resources in the east region 412-1. This traffic may be divided evenly between compute instances 430-1, 430-2, 430-3, 430-4, 430-5 such that each compute instance in east region 412-1 receives 22% of the traffic flow (20% from primary resource utilizer 402 and 2% from secondary resource utilizer 404). As previously discussed, the 20% traffic flow to each compute instance in east region 412-1 from primary resource utilizer 402 can result in 80% resource utilization of the corresponding resources for a respective primary resource utilizer 402 load. Further, the 2% traffic flow to each compute instance in the east region 412-1 from auxiliary resource utilizer 402 can result in 8% resource utilization of the corresponding resource for a respective auxiliary resource utilizer 404 load.

Accordingly, compute instance 430-1 may include traffic flow 440-1 of 22% and resource utilization 442-1 of 88%, compute instance 430-2 may include traffic flow 440-2 of 22% and resource utilization 442-2 of 88%, compute instance 430-3 may include traffic flow 440-3 of 22% and resource utilization 442-3 of 88%, compute instance 430-4 may include traffic flow 440-4 of 22% and resource utilization 442-4 of 88%, and compute instance 430-5 may include traffic flow 440-5 of 22% and resource utilization 442-5 of 88%, In one or more embodiments, these values may be determined by resource utilization monitor 220.

Further, 90% of the traffic from auxiliary resource utilizers 404 is being directed to west region 412-2 while the west region 412-2 still receives no traffic from primary resource utilizers 402. For example, west region 412-2 may provide failover and/or dark instances for east region 412-1. In many embodiments, west region 412-2 may receive a minimal amount of traffic flow and/or resource utilization (e.g., <5%) to ensure proper operations and readiness of the resources in the region. As shown in the illustrated embodiment, 90% of the traffic from auxiliary resource utilizer 404 may be routed to the west region 412-2 and the traffic may be divided evenly between compute instances 432-1, 432-2, 432-3, 432-4, 432-5 such that each compute instance in west region 412-2 receives 18% of the traffic flow from auxiliary resource utilizer 404.

In various embodiments, the 18% traffic flow to each compute instance in west region 412-2 may result in 72% resource utilization of the corresponding resources to process a respective traffic load from auxiliary resource utilizer 404. It will be appreciated that traffic loads may vary with time with higher traffic loads corresponding to higher resource utilization. Compute instance 432-1 may include traffic flow 444-1 of 18% and resource utilization 446-1 of 72%, compute instance 432-2 may include traffic flow 444-2 of 18% and resource utilization 446-2 of 72%, compute instance 432-3 may include traffic flow 444-3 of 18% and resource utilization 446-3 of 72%, compute instance 432-4 may include traffic flow 444-4 of 18% and resource utilization 446-4 of 72%, and compute instance 432-5 may include traffic flow 444-5 of 18% and resource utilization 446-5 of 72%, In one or more embodiments, these values may be determined by resource utilization monitor 220.

Figure 5:
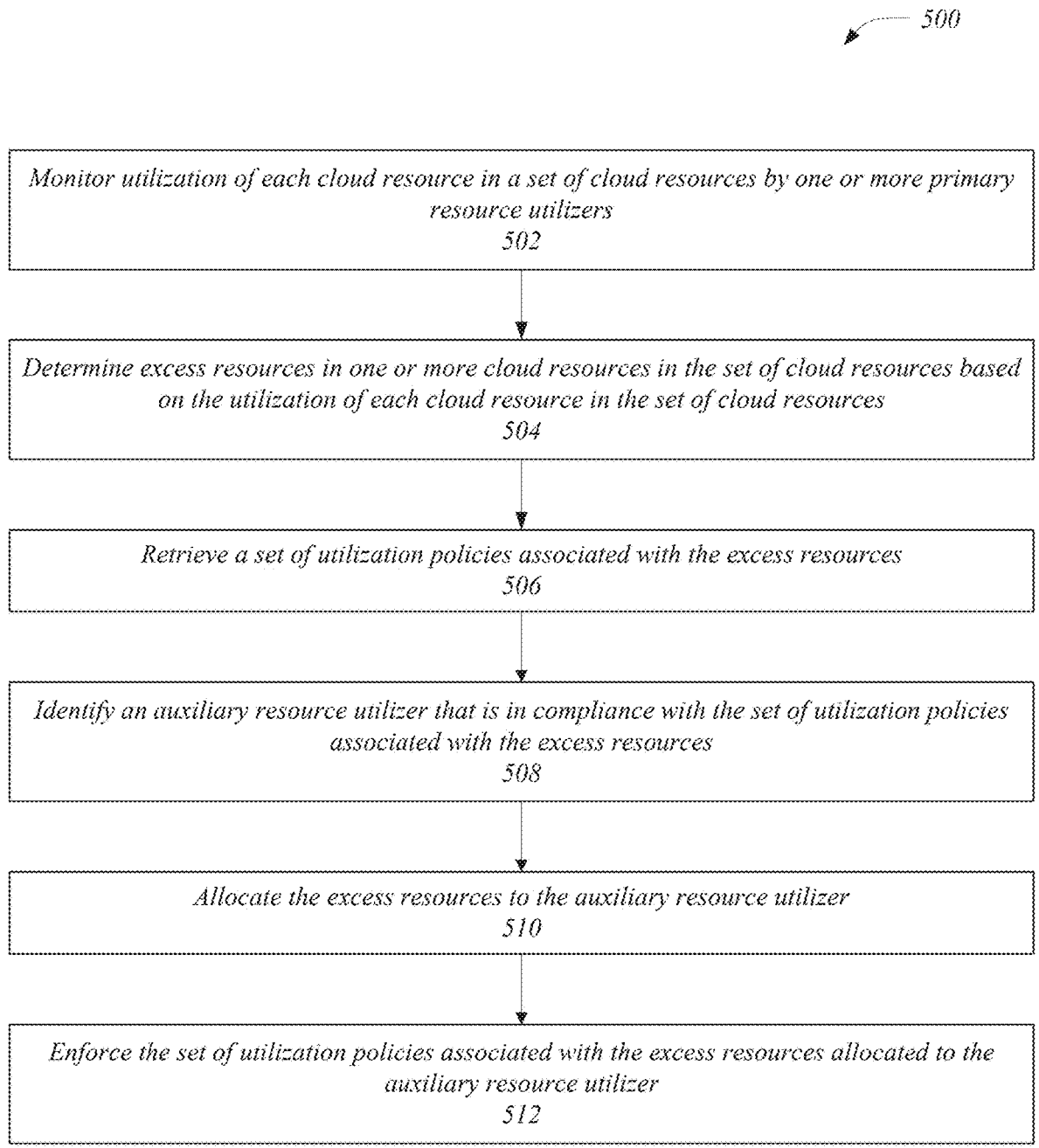
FIG. 5 illustrates an exemplary logic flow according to one or more embodiments described herein.

FIG. 5 illustrates one embodiment of a logic flow 500, which may be representative of operations that may be executed in various embodiments in conjunction with identification and/or utilization of excess resources in a cloud system, such as by excess resource manager 108. The logic flow 500 may be representative of some or all of the operations that may be executed by or implemented on one or more components/devices described herein. The embodiments are not limited in this context.

In the illustrated embodiment shown in FIG. 5, the logic flow 500 may begin at block 502. At block 502 "monitor utilization of each cloud resource in a set of cloud resources by one or more primary resource utilizers" the utilization of each cloud resource in a set of cloud resource by one or more primary resource utilizers. For example, resource utilization monitor 220 may monitor utilization of one or more resources 114-1, 114-2, 114-n in one or more resources 112-1, 112-2, 112-n. In some embodiments, the resource utilization monitor 220 may be implemented in cloud system 110 by one or more components of system controller 105.

Continuing to block 504 "determine excess resources in one or more cloud resources in the set of cloud resource based on the utilization of each cloud resource in the set of cloud resources" excess resources may be determined in one or more cloud resources based on their utilization. For instance, excess resources may be identified in by excess resource manager 408. At block 506 "retrieve a set of utilization policies associated with the excess resources" a set of utilization policies associated with the excess resources may be retrieved. For example, excess resource manager 108 may retrieve one or more of utilization policies 107.

Proceeding to block 508 "identify an auxiliary resource utilizer that is in compliance with the set of utilization policies associated with the excess resources" an auxiliary resource utilizer in compliance with the associated utilizations policies may be identified. For instance, excess resource manager 108 may identify one or more of auxiliary resource utilizers 104-1, 104-2, 104-*n* that are in compliance with one or more of the utilization policies 107 associated with the excess resources identified in one or more of resources 112-1, 112-2, 112-*n*. At block 510 "allocate the excess resources to the auxiliary resource utilizer" the excess resources may be allocated to the auxiliary resource utilizer. For example, excess resource allocator 338 may allocate excess resources identified in resources 114-1 of region 112-1 to auxiliary resource utilizer 104-2. Continuing to block 512 "enforce the set of utilization policies associated with the excess resources allocated to the auxiliary resource utilizer" the associated set of utilization policies may be enforced. In various embodiments, the associated set of utilization policies may be enforced by excess resource manager 108 and/or excess resource allocator 338. For example, excess resource allocator 338 may enforce a utilization policy by reassigning a resource from an auxiliary resource utilizer to a primary resource utilizer based on utilization the primary resource utilizer.

Figure 6:
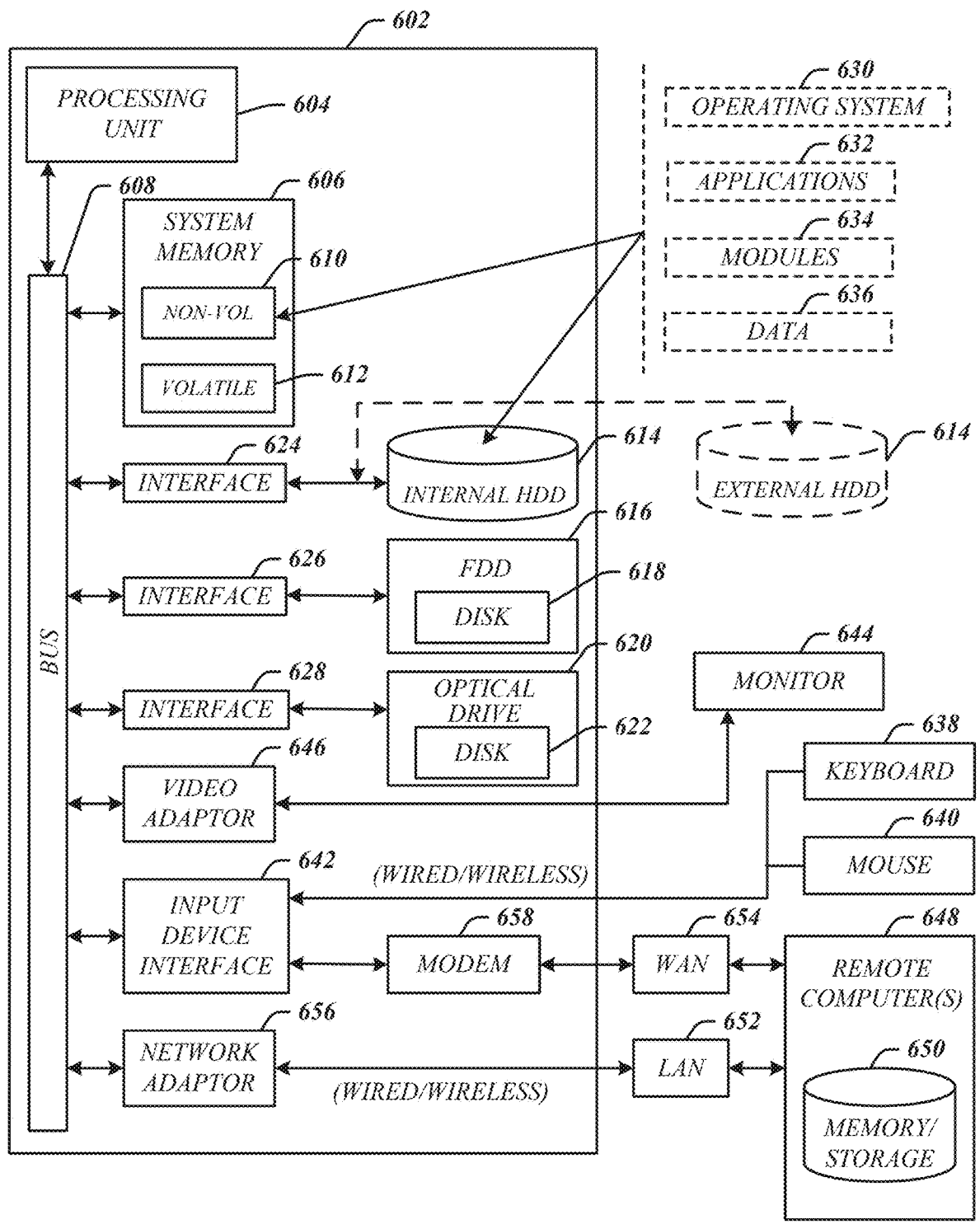
FIG. 6 illustrates exemplary aspects of a computing architecture according to one or more embodiments described herein.

FIG. 6 illustrates an embodiment of an exemplary computing architecture 600 that may be suitable for implementing various embodiments as previously described. In various embodiments, the computing architecture 600 may comprise or be implemented as part of an electronic device. In some embodiments, the computing architecture 600 may be representative, for example, of a computer system that implements one or more components described herein. In some embodiments, computing architecture 600 may be representative, for example, one or more portions, such as hardware components, of resources 114-1, 114-2, 114-*n* (e.g., hardware implementing one or more compute instances) that implement one or more embodiments, such as software components, described herein (e.g., traffic manager 106 and/or excess resource manager 108). The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chip-sets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 604.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 994 interface technologies.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include, for example, the various applications and/or components described herein.

A user can enter commands and information into the computer 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 604 through an input device interface 642 that is coupled to the system bus 608, but can be connected by other interfaces such as a parallel port, IEEE 994 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. In various embodiments, one or more interactions described herein may occur via the networked environment. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 7:
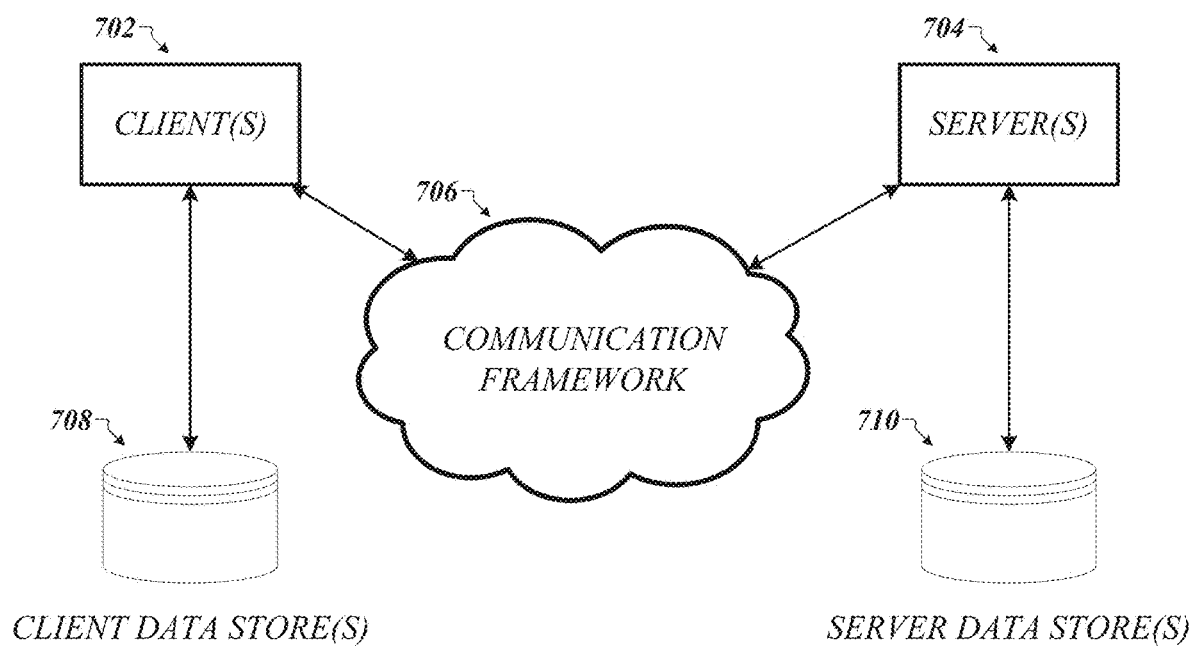
FIG. 7 illustrates exemplary aspects of a communications architecture according to one or more embodiments described herein.

FIG. 7 illustrates a block diagram of an exemplary communications architecture 700 suitable for implementing various embodiments as previously described, such as applications or services described herein. The communications architecture 700 includes various common communications elements, such as a transmitter, receiver, transceiver, radio, network interface, baseband processor, antenna, amplifiers, filters, power supplies, and so forth. The embodiments, however, are not limited to implementation by the communications architecture 700.

As shown in FIG. 7, the communications architecture 700 comprises includes one or more clients 702 and servers 704. The clients 702 and the servers 704 are operatively connected to one or more respective client data stores 708 and server data stores 710 that can be employed to store information local to the respective clients 702 and servers 704, such as cookies and/or associated contextual information. In various embodiments, any one of servers 704 may implement one or more of logic flows or operations described herein, and storage mediums described herein, such as in conjunction with storage of data received from any one of clients 702 on any of server data stores 710.

The clients 702 and the servers 704 may communicate information between each other using a communication framework 706. The communications framework 706 may implement any well-known communications techniques and protocols. The communications framework 706 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 706 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 702 and the servers 704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

The invention claimed is:

1. An apparatus, comprising:
   a processor; and
   a memory comprising instructions that when executed by the processor cause the processor to:
   identify at least some resources in one or more cloud resources in a set of cloud resources when utilization of the one or more cloud resources by a primary resource utilizer exceeds a threshold;
   after the at least some resources are identified, identify an auxiliary resource utilizer that is in compliance with a set of utilization policies associated with the at least some resources; and
   after the auxiliary resource utilizer is identified, dynamically allocate the at least some resources to the auxiliary resource utilizer for utilization according to the set of utilization policies.

2. The apparatus of claim 1, the memory comprising instructions that when executed by the processor cause the processor to reroute a type of traffic from the primary resource utilizer to the auxiliary resource utilizer.

3. The apparatus of claim 2, wherein the type of traffic comprises video traffic.

4. The apparatus of claim 1, wherein the at least some resources serve a failover role for the primary resource utilizer while the at least some resources are utilized by the auxiliary resource utilizer.

5. The apparatus of claim 1, the memory comprising instructions that when executed by the processor cause the processor to reallocate at least a portion of the at least some resources to the primary resource utilizer.

6. The apparatus of claim 1, the memory comprising instructions that when executed by the processor cause the processor to identify the auxiliary resource utilizer based, at least in part, on a first traffic type generated by the primary resource utilizer and processed by the at least some resources matching a second traffic type generated by the auxiliary resource utilizer.

7. The apparatus of claim 1, the memory comprising instructions that when executed by the processor cause the processor to identify the auxiliary resource utilizer based, at least in part, on a first creation environment associated with the primary resource utilizer matching a second creation environment associated with the auxiliary resource utilizer.

8. The apparatus of claim 1, the memory comprising instructions that when executed by the processor cause the processor to identify the auxiliary resource utilizer based, at least in part, on acceptance of one or more utilization policies in the set of utilization policies by the auxiliary resource utilizer.

9. At least one non-transitory computer-readable medium comprising a set of instructions that, in response to being executed by a processor circuit, cause the processor circuit to:
   identify at least some resources in one or more cloud resources in a set of cloud resources when utilization of the one or more cloud resources by a primary resource utilizer exceeds a threshold;
   after the at least some resources are identified, identify an auxiliary resource utilizer that is in compliance with a set of utilization policies associated with the at least some resources; and
   after the auxiliary resource utilizer is identified, dynamically allocate the at least some resources to the auxiliary resource utilizer for utilization according to the set of utilization policies.

10. The at least one non-transitory computer-readable medium of claim 9, comprising instructions that, in response to being executed by the processor circuit, cause the processor circuit to reroute a type of traffic from the primary resource utilizer to the auxiliary resource utilizer.

11. The at least one non-transitory computer-readable medium of claim 9, wherein the at least some resources serve a failover role for the primary resource utilizer while the at least some resources are utilized by the auxiliary resource utilizer.

12. The at least one non-transitory computer-readable medium of claim 9, comprising instructions that, in response to being executed by the processor circuit, cause the processor to reallocate the at least some resources to the primary resource utilizer.

13. The at least one non-transitory computer-readable medium of claim 9, comprising instructions that, in response to being executed by the processor circuit, cause the processor circuit to identify the auxiliary resource utilizer based, at least in part, on a first traffic type generated by the primary resource utilizer and processed by the at least some resources matching a second traffic type generated by the auxiliary resource utilizer.

14. The at least one non-transitory computer-readable medium of claim 9, comprising instructions that, in response to being executed by the processor circuit, cause the processor circuit to identify the auxiliary resource utilizer based, at least in part, on a first creation environment associated with the primary resource utilizer matching a second creation environment associated with the auxiliary resource utilizer.

15. The at least one non-transitory computer-readable medium of claim 9, comprising instructions that, in response to being executed by the processor circuit, cause the processor circuit to identify the auxiliary resource utilizer based, at least in part, on acceptance of one or more utilization policies in the set of utilization policies by the auxiliary resource utilizer.

16. A computer implemented method, comprising:
   identifying at least some resources in one or more cloud resources in a set of cloud resources when utilization of the one or more cloud resources by a primary resource utilizer exceeds a threshold;
   after the at least some resources are identified, identifying an auxiliary resource utilizer that is in compliance with a set of utilization policies associated with the at least some resources; and
   after the auxiliary resource utilizer is identified, dynamically allocating the at least some resources to the auxiliary resource utilizer for utilization according to the set of utilization policies.

17. The computer implemented method of claim 16, comprising rerouting a type of traffic from the primary resource utilizer to the auxiliary resource utilizer.

18. The computer implemented method of claim 16, comprising identifying the auxiliary resource utilizer based, at least in part, on a first traffic type generated by the primary resource utilizer and processed by the at least some resources matching a second traffic type generated by the auxiliary resource utilizer.

19. The computer implemented method of claim 16, comprising identifying the auxiliary resource utilizer based, at least in part, on a first creation environment associated with the primary resource utilizer matching a second creation environment associated with the auxiliary resource utilizer.

20. The computer implemented method of claim 16, comprising identifying the auxiliary resource utilizer based, at least in part, on acceptance of one or more utilization policies in the set of utilization policies by the auxiliary resource utilizer.

* * * * *